(12) United States Patent
Jaffrey

(10) Patent No.: US 6,294,131 B1
(45) Date of Patent: Sep. 25, 2001

(54) HEAT RESISTANT STEEL

(75) Inventor: Donald Jaffrey, Mount Dandenong (AU)

(73) Assignee: Ceramic Fuel Cells Limited, Victoria (AU)

( * ) Notice: Subject to any disclaimer, the term of this patent is extended or adjusted under 35 U.S.C. 154(b) by 0 days.

(21) Appl. No.: 09/554,709

(22) PCT Filed: Nov. 17, 1998

(86) PCT No.: PCT/AU98/00956

§ 371 Date: Jul. 14, 2000

§ 102(e) Date: Jul. 14, 2000

(87) PCT Pub. No.: WO99/25890

PCT Pub. Date: May 27, 1999

(30) Foreign Application Priority Data

Nov. 17, 1997 (AU) .............................................. PP0425/97

(51) Int. Cl.⁷ ..................................................... C22C 38/18
(52) U.S. Cl. ............................ 420/40; 148/331; 148/325
(58) Field of Search .............................. 420/40; 148/331, 148/325

(56) References Cited

U.S. PATENT DOCUMENTS

| | | |
|---|---|---|
| 4,610,734 | 9/1986 | Hartwig et al. . |
| 4,812,176 | 3/1989 | Tanaka et al. . |
| 5,110,544 * | 5/1992 | Sato et al. ............................... 420/40 |
| 5,228,932 * | 7/1993 | Shimizu et al. ........................ 420/40 |
| 5,407,758 | 4/1995 | Greiner et al. . |

FOREIGN PATENT DOCUMENTS

| | | |
|---|---|---|
| 0597129A1 | 5/1994 | (EP) . |
| 165360-A * | 8/1985 | (JP) ........................................ 420/40 |
| 804710 * | 2/1981 | (RU) ...................................... 420/40 |
| 97/30485 | 8/1997 | (WO) . |

OTHER PUBLICATIONS

Derwent Abstract Accession No. 87164y/49, Class M27, JP, A, 52–127423 (Honda Motor KK (KAWI)) Oct. 26, 1997.
Patent Abstracts of Japan, C1004, p. 33, JP, A, 04–202746 (Aichi Steel Works LTD.) Jul. 23, 1992.
Derwent Abstract Accession No. 85592 C/48 Class M27 JP, A, 80–043070 (Citizen Watch KK), Nov. 4, 1980.
Patent Abstracts of Japan JP, A, 06–293941 (Sumitomo Metal Ind. Ltd.) Oct. 21, 1994.
Patent Abstracts of Japan, JP, A, 07–166301 (Tokyo Gas CO LTD.) Jun. 27, 1995.
Patent Abstracts of Japan, C551, p. 14, JP, A, 63–190143 (Hitachi LTD.) Aug. 5, 1988.
Patent Abstracts of Japan, JP, A, 09–157801 (Hitachi Metals LTD.) Jun. 17, 1997.
Derwent Abstract Accession No. 43058 w/26, Class M27, DT 2459604 (Citizen Watch KK) Jun. 19, 1975.
Derwent Abstract Accession No. 06175x/04, Class M24, R42, JP, A, 50–078516, (Citizen Watch KK), Jun. 26, 1975.

* cited by examiner

*Primary Examiner*—Deborah Yee
(74) *Attorney, Agent, or Firm*—David J. Brezner; Flehr Hohbach Test Albritton & Herbert LLP

(57) ABSTRACT

A steel composition particularly useful for components of solid oxide fuel cells, for example a connector plate for collecting electrical current from a solid oxide fuel cell, consisting of, in weight percent, 18–28.5 Cr, 0.001–0.20 C, <0.1 Si, 0.005–0.10 Mn, <1.0 Ni, <0.25 N, <0.05 S, <0.08 P, <0.06 Al, <0.25 Additional Defined Metals, and 0.005–0.50 REM, wit the residue iron, excluding incidental impurities, where Additional Defined Metals is the sum of titanium, niobium, vanadium, molybdenum and copper, and REM is one or more of the rare earth metal elements in the group of the lanthanide elements 57 to 71, scandium and yttrium.

7 Claims, No Drawings

HEAT RESISTANT STEEL

This application is a 371 of PCT/AU98/00956 filed Nov. 17, 1998.

The present invention relates to a heat resistant steel, and is particularly concerned with such a steel for use in components of solid oxide fuel cells.

The operating conditions in a solid oxide fuel cell are very severe on most metals, causing them to degrade via loss of mechanical strength, oxidation or other form of corrosion, distortion, erosion or creep. Various heat resistant metals have been developed to cope with many of these forms of degradation. Most such metals are alloys based on iron or nickel with substantial additions of chromium, silicon and/or aluminium, plus, in some alloys, more expensive elements such as cobalt, molybdenum and tungsten. Chromium based metals are also available.

These alloys are either expensive to make and fabricate, unsuitable for long term use in certain components in fuel cells, or both. A relatively cheap iron based steel which is sufficiently suitable for critical fuel cell components has not hitherto been developed.

The significant feature of all heat resistant steels is the oxide layer, particularly its type and nature, which is formed when the steel is exposed to mildly and strongly oxidising conditions at elevated temperatures. Heat resisting steels form tight, adherent, dense oxide layers which prevent further oxidation of the underlying metal. These oxide layers are composed of chromium, aluminium or silicon oxides or some combination of these. These oxide layers are very effective in providing a built-in resistance to degradation due to high temperature oxidation.

However, while this feature is used to advantage in many applications, the presence of this oxide layer inhibits the use of these steels in key components of solid oxide fuel cells. The oxides, especially those of silicon and aluminium, are electrically insulating at all temperatures, and this is a major problem for those components in a fuel cell which must act as electrical current collectors. Of all the heat resisting steels available, those based on the iron-chromium binary systems are the best in this regard, but they too have severe limitations.

The currently available steels contain additional elements which have been found to affect the nature of the oxide layer when it forms. These elements are present in small quantities, either as deliberate additions to assist with the control of oxygen during steelmaking, or as residual impurities inherited from the raw materials used in making the steel, i.e. tramp elements. Many of these minor elements have a profound effect on the type and thickness of the oxide layer which forms on the surface of the steel when it is subjected to oxidation at elevated temperatures. For example, manganese is deliberately added to most steels to assist with the deoxidation of the iron during melting and to eliminate iron sulphides from the steel. This is beneficial for most applications of heat resistant steels, but not when the steel is used as an interconnect or connector plate in a solid oxide fuel cell.

In a paper in "Nature" Feb. 13, 1965, vol.205, p.609, Caplan and Cohen reported that in tests of high temperature oxidation rates on Fe-26Cr alloys, those with manganese levels around 0.003 to 0.004 weight percent oxidised slower than those with levels of 0.75 to 1.00 percent manganese. The applicant has now found that the presence of manganese in quantities above 0.10 percent by weight modifies the form of the oxide layer as it begins to grow, giving rise to a rather loose and wavy layer. This results in a particularly poor electrical conductivity through the layer, at the stage of formation and at a later stage when the composition may have shifted to one of the other more stable oxides such as chromium oxide. The applicant has also found that the beneficial properties of low oxidation rates can be achieved at manganese levels much higher than the 0.003 to 0.004 weight percent levels of Caplan and Cohen, providing the manganese level is kept below 0.10 weight percent and providing the inclusion of certain other elements is also limited. This higher permissible manganese level allows the production of commercial tonnages of steel at a reasonable price.

Another example is the effect which the element silicon has on the formation of oxide layers at the surface of the steel. Silicon and aluminium are used as cheap and effective additives to control the oxidation of iron during the steel smelting process. Small amounts of silicon, e.g. 0.5 weight percent, in an iron chromium heat resisting steel lead to the formation of a subsurface layer of silica which, if fully formed, has a very high electrical resistivity. For most applications this feature is not deleterious, but for a connector plate in a solid oxide fuel cell it completely negates a prime purpose of the component.

For these heat resisting steels to be useful for electrical conducting components in fuel cells, it is important that the aforementioned disadvantages be alleviated.

According to the present invention there is provided a steel composition consisting of, in weight percent,

| | |
|---|---|
| Chromium | 18–28.5 |
| Carbon | 0.001–0.20 |
| Silicon | <0.1 |
| Manganese | 0.005–0.10 |
| Nickel | <1.0 |
| Nitrogen | <0.25 |
| Sulphur | <0.05 |
| Phosphorus | <0.08 |
| Aluminium | <0.06 |
| Additional Defined Metals | <0.25 |
| REM | 0.005–0.50 | with the residue iron, excluding incidental impurities, and where Additional Defined Metals is the sum of titanium, niobium, vanadium, molybdenum and copper.

Further according to the present invention, there is provided, in a solid oxide fuel cell stack, a component adapted to be exposed to a temperature in excess of 750° C. and an oxidising atmosphere, said component being formed of a steel composition in accordance with the invention.

Still further according to the invention, there is provided a connector plate for collecting electrical current from a fuel cell, said plate being formed of a steel composition in accordance with the invention.

The deleterious effects of the significant minor elements in known heat resistant steels have been alleviated according to the invention by controlling their levels to subcritical values. Any incidental impurities not specifically identified in accordance with the invention may be present, but any such presence should be at no more than trace levels.

In addition, REM elements, which are not usually present in commonly available steels, are included, singly or in combination, in the steel composition according to the invention. REM is hereby defined as meaning any one or more of the rare earth metal elements in the group of the lanthanide elements 57 to 71, scandium and yttrium, and are preferably present to a total level in the range of 0.01 to 0.25 wt %. The presence of REM in these small, precisely controlled amounts helps stabilise the oxide layers at a much reduced thickness and improved adhesion and hence assists in reducing the electrical resistivity of the oxide scale on the surface of the steel component.

Steels made according to the invention form a stable, adherent and very thin layer of chromium oxide which protects the underlying metal from further oxygen induced degradation and provides a level of electrical conductivity which is substantially superior to that possible with similar steels manufactured to their accepted specifications.

Preferred and more preferred composition ranges in the present invention are as follows:

|  | Preferred | More Preferred |
|---|---|---|
| Chromium | 20–27.5 | 23–25 |
| Carbon | 0.01–0.08 | 0.03–0.06 |
| Silicon | <0.1 | <0.09 |
| Manganese | 0.005–0.05 | 0.005–0.05 |
| Nickel | <0.1 | <0.02 |
| Nitrogen | <0.20 | <0.10 |
| Sulphur | <0.03 | <0.01 |
| Phosphorus | <0.04 | <0.04 |
| Aluminium | <0.05 | <0.05 |
| Additional Defined Metals | up to 0.10 | <0.10 |
| REM | 0.01–0.25 | 0.01–0.10 | residue, iron excluding incidental impurities.

Steels made to a composition in accordance with the invention yield fuel cell component performances which may be superior to those obtainable with other heat resistant metals currently available, in one or more of the following properties:

a. Cost Per Unit Mass

The unit cost of steels in accordance with the invention is less than that of other materials such as nickel alloys, austenitic stainless steels, chromium alloys and ceramics which have been used for interconnect plates in solid oxide fuel cells.

b. Toughness

The composition of the invention results in ferritic steels which are as tough, i.e. resistant to cracking, as most other ferritic steels and much tougher than all of the ceramics and the chromium based alloys such as "Ducrolloy" produced by Metallwerk Plansee GmbH. Typical toughness values, expressed as "elongation to fracture in a tensile test", are 12–25% for ferritic stainless steels and 0–0.5% for Ducrolloy. A high toughness level has a great advantage during fabrication, forming (into shapes), assembly, and refurbishment, since a tougher metal is able to tolerate small elastic and plastic strains far better than can brittle materials.

c. Hot Ductility

The composition of the invention results in a steel which has the ability to plastically deform under relatively low loads at typical solid oxide fuel cell operating temperatures. This plastic "compliance" ensures a good general contact between the contiguous surfaces of fuel cell components under light loads, a contact which greatly improves the electrical performance of the fuel cell and reduces any high load points that may exist. These high load points in fuel cell components such as connector plates can lead to cracking of the relatively brittle electrolyte plates which in turn may allow the direct mixing of fuel and air at the fracture. The resultant fire can lead directly to the failure of the fuel cell assembly. Other materials such as Ducrolloy and all ceramics do not possess this property of plastic compliance to any useful extent and the contacting surfaces of plates made from such materials have to be carefully prepared to enable good contact to be made. Because the steel made according to the present invention possesses good ductility and a lower mechanical strength, it is not as prone to the phenomenon of "springback" as is Ducrolloy and many other heat resistant steels. This property renders the present steel less prone to unwanted distortion during the operation of the fuel cell assembly, especially during temperature fluctuations, start up and cool down.

d. Oxidation Resistance

The steel produced according to the invention has an excellent, inherent resistance to surface degradation at temperatures within the range 500° C.–950° C. in the atmospheres usually present in a solid oxide fuel cell, namely moist air, moist hydrogen, moist hydrocarbons and oxides of carbon. This oxidation resistance is approximately equal to that of Ducrolloy and to that of all other commercial stainless steels except those which contain at least 4.5% by weight of aluminium. (It is to be noted that once the aluminium level of a steel exceeds approximately 4.5% by weight, the oxide layer which forms on exposed surfaces of the steel is composed of alumina which has a very low electrical conductivity.) The superior oxidation resistance of steels made to the composition of the invention can be further enhanced by suitable chemical treatment of the surface by methods such as calorising or coating with a protective layer of another material.

e. Thermal Expansion Compatibility with Zirconia

At typical operating temperatures, i.e. 700° C.–1000° C., the thermal expansion coefficient (CET) of the steel according to the invention is within 10% of that of the partially stabilised zirconia which is the basic material of solid oxide fuel cell electrolytes. This means that thermally induced strains do not give rise to stresses which are sufficient to cause cracks in the cells. In this regard the steel composition of the invention is as good as any other metal used for interconnect plates and superior to many.

f. Machinability

The steel made to the composition of the invention is easily machined by conventional metal cutting techniques and in this regard is superior to the austenitic, martensitic and dual phase stainless steels, as well as to the nickel based alloys and chromium based alloys currently used for interconnect plates.

g. Weldability

The steel of the invention is readily weldable without special preparation, electrodes or equipment, and without pre- or post-heating. This property makes it more convenient to fabricate with conventional industrial techniques and easier to repair and modify than other alloys such as Ducrolloy.

Steels having a composition in accordance with the invention are not restricted to any particular processing techniques, including for cooling from melt temperatures, and may be processed and/or treated similarly to other ferritic steels such as grade 446 steel.

Batches of steels made to the above broadest specification have proven to be effective in fuel cells tested by the applicant, and to be superior in performance to alloys made to currently accepted specifications. For example, a solid oxide fuel cell stack composed of 50 cells, each with a nominal size of 150×150 mm, was constructed with interconnect plates machined from plates of Ducrolloy supplied by Plansee. When operated, it suffered from distortion of the interconnect plates, leading to cracking of the electrolyte plates and poor electrical contacts, and yielded a maximum power output of approximately 0.75 kW at 930° C. The Ducrolloy interconnect plates were so brittle after service in the fuel cell stack that none was able to be disassembled intact.

Experimental batches of twenty two different steels according to the present invention were manufactured and tested over a period of more than a year. Analyses of the steels are shown in Table 1. While the laboratory equipment used to measure yttrium levels was incapable of detecting levels below 0.01 wt %, in view of the method used to produce the steels it is believed that the five steels identified in Table 1 with Y levels <0.01 wt % in fact contained about 0.005 wt % yttrium. This series of tests culminated in a test on a stack of solid oxide fuel cells as described below using fuel cell interconnect plates made from fifteen of the above twenty two batches all falling within the following weight percent ranges:

| | |
|---|---|
| Cr | 26.25–28 |
| C | 0.0025–0.090 |
| Si | 0.01–0.09 |
| Mn | 0.01 |
| Ni | 0.01 |
| N | <0.001 |
| S | 0.001–0.002 |
| P | 0.002 |
| Al | 0.007–0.056 |
| Ti + Nb + V + Mo + Cu | <0.04 |
| REM | 0.005–0.15, | residue iron, excluding incidental impurities any of which were at trace levels or below.

The fifteen steel compositions used in this stack test are indicated in Table 1 by having a Fabrication Number assigned at the top of the table.

Forty seven interconnect plates, variously made from these fifteen steel compositions, were formed and assembled into a stack which was identical to the stack of the above comparative example (which used the Ducrolloy plates) except that fifty plates were used in the comparative example. Under the same operating conditions, this stack of cells produced a maximum power output of 1.55 kW. All interconnect plates were removed intact from this stack and all were suitable for refurbishment and reuse.

The compositions of the interconnect plates of the present invention tested in the stack test varied for some elements across a significant range and the spread of compositions illustrates the scope of the invention. A major cause of the variation in compositions was the nature of the small ingot fabrication facility which meant that a number of batches had to be made and it proved difficult to make them of the identical composition with the available facilities. Except for the chromium and carbon levels, the majority of the composition ranges fell within the above more preferred composition range. With regard to the chromium levels, it is recognized that similar performance advantages would be achieved at the lower, more preferred amounts of 23–25 wt % with additional cost savings.

Steel batches 3824, 3825, 3826, 3832, 3837 and 3841 proved difficult to hot roll for fabrication of the interconnect plates and were not used for the stack test. The difficulty arose because chromium and carbon are prone to combine during solidification or cooling phases of manufacture and to form a chromium carbide phase which may render the steel unworkable if it is present in sufficient volume. If the wt % chromium is at the higher end of the given range and the carbon is likewise near the upper limit, care is required during subsequent processing to avoid the formation of carbide initiated cracking of the steel. If however the steel is able to be processed, its performance is satisfactory.

In the more preferred range of composition, the upper levels of chromium and carbon are lower, and hence the danger of chromium carbide formation is greatly reduced: the steel is more readily processed and its performance is also satisfactory.

If any of the Additional Defined Metals group of elements is present, it is preferred that this be mostly or completely titanium because of cost considerations. However it is believed that the effect of titanium is due to the formation of titanium carbo-nitrides and, as the other elements in the Additional Defined Metals group are known to have similar properties, they may be substituted in whole or in part for the titanium if wished.

With respect to the REM elements, the various steels used in the stack test Example all use yttrium as the only REM element. However the other elements in the REM group as defined are known to have a similar effect in stabilising the oxide layers at a reduced thickness and could be substituted for yttrium if wished. The five steels analysed at less than 0.01 wt % yttrium gave improved performances compared to corresponding compositions without any yttrium, but detectively lower performances than equivalent steels in Table 1 with higher yttrium levels.

In addition to interconnect plates, the steel of the invention may be used for other components of fuel cells, particularly solid oxide fuel cells, such as manifolds, base plates, current collector straps and ducting. The steel may also be used in other fields requiring one or more of the aforementioned desirable properties, such as heat exchanger plates, hot gas ducting, vanes, connectors, piping and tubing.

Those skilled in the art will appreciate that the invention described herein is susceptible to variations and modifications other than those specifically described. It is to be understood that the invention includes all such variations and modifications which fall within its spirit and scope.

TABLE 1

| Analysis of Experimental Steels | | | | | | | | | | | |
|---|---|---|---|---|---|---|---|---|---|---|---|
| Batch Mixture No. | 10 | 11 | 12 | 3816 | 3824 | 3825 | 3826 | 3827 | 3828 | 3829 | 3830 |
| Batch Fabrication No. | 02/1 | 01/1 | — | 02/5 | — | — | — | 02/1 | 04/3 | 01/1 | 04/1 |
| Cr | 27.40 | 26.75 | 18.15 | 27.15 | 27.40 | 26.10 | 26.75 | 26.55 | 26.80 | 26.50 | 26.60 |
| C | 0.0031 | 0.0025 | 0.036 | 0.011 | 0.095 | 0.100 | 0.095 | 0.090 | 0.090 | 0.065 | 0.070 |
| Si | 0.02 | 0.03 | 0.01 | 0.02 | 0.02 | 0.02 | 0.02 | 0.02 | 0.01 | 0.02 | 0.01 |
| Mn | 0.01 | 0.01 | 0.01 | 0.01 | 0.01 | 0.01 | 0.01 | 0.01 | 0.01 | 0.01 | 0.01 |
| Ni | 0.010 | 0.010 | 0.38 | 0.010 | 0.010 | 0.010 | 0.010 | 0.010 | 0.010 | 0.010 | 0.010 |
| N | <0.001 | <0.001 | <0.001 | <0.001 | <0.001 | <0.001 | <0.001 | <0.001 | <0.001 | <0.001 | <0.001 |
| S | 0.001 | 0.001 | 0.018 | 0.001 | 0.001 | 0.001 | 0.001 | 0.001 | 0.001 | 0.001 | 0.002 |
| P | 0.002 | 0.002 | 0.002 | 0.002 | 0.002 | 0.002 | 0.002 | 0.002 | 0.002 | 0.002 | 0.002 |
| Al | <0.05 | <0.05 | <0.05 | 0.042 | 0.036 | 0.041 | 0.038 | 0.036 | 0.020 | 0.025 | 0.007 |
| Ti | <0.01 | <0.01 | <0.01 | <0.01 | <0.01 | <0.01 | <0.01 | <0.01 | <0.01 | <0.01 | <0.01 |
| Nb | <0.01 | <0.01 | <0.01 | <0.01 | <0.01 | <0.01 | <0.01 | <0.01 | <0.01 | <0.01 | <0.01 |
| V | <0.01 | <0.01 | <0.01 | <0.01 | 0.009 | 0.009 | 0.007 | 0.007 | 0.008 | 0.006 | 0.006 |
| Mo | 0.005 | 0.005 | 0.005 | 0.003 | <0.002 | <0.002 | <0.002 | <0.002 | <0.002 | <0.002 | <0.002 |
| Cu | 0.002 | 0.002 | 0.002 | 0.003 | <0.002 | <0.002 | <0.002 | <0.002 | <0.002 | <0.002 | <0.002 |
| Y | <0.01 | 0.02 | <0.01 | 0.09 | 0.07 | 0.10 | 0.10 | 0.10 | 0.09 | 0.09 | 0.01 |

TABLE 1-continued

Analysis of Experimental Steels

| | | | | | | | | | | | |
|---|---|---|---|---|---|---|---|---|---|---|---|
| Ti + Nb + V + Mo + Cu | <0.04 | <0.04 | <0.04 | <0.04 | <0.04 | <0.04 | <0.04 | <0.04 | <0.03 | <0.03 | <0.03 |
| Cr + 30xC | 27.50 | 26.83 | 19.23 | 27.48 | 30.25 | 29.10 | 29.6 | 29.25 | 29.5 | 29.05 | 28.70 |
| | | | | | | | | | | | |
| Batch Mixture No. | 3832 | 3833 | 3835 | 3836 | 3837 | 3838 | 3840 | 3841 | 3842 | 3843 | 3844 |
| Batch Fabrication No. | — | 04/5 | 02/3 | 04/7 | — | 01/2 | 01/2 | — | 02/3 | 01/3 | 01/2 |
| | | | | | | | | | | | |
| Cr | 26.10 | 28.00 | 26.90 | 27.45 | 27.55 | 26.30 | 27.00 | 26.45 | 26.65 | 26.25 | 27.60 |
| C | 0.130 | 0.075 | 0.075 | 0.080 | 0.090 | 0.080 | 0.075 | 0.130 | 0.060 | 0.070 | 0.049 |
| Si | 0.05 | 0.02 | 0.03 | 0.03 | 0.03 | 0.06 | 0.06 | 0.06 | 0.05 | 0.06 | 0.09 |
| Mn | 0.01 | 0.01 | 0.01 | 0.01 | 0.01 | 0.01 | 0.01 | 0.01 | 0.01 | 0.01 | 0.01 |
| Ni | 0.010 | 0.010 | 0.010 | 0.010 | 0.010 | 0.010 | 0.010 | 0.010 | 0.010 | 0.010 | 0.010 |
| N | <0.001 | <0.001 | <0.001 | <0.001 | <0.001 | <0.001 | <0.001 | <0.001 | <0.001 | <0.001 | <0.001 |
| S | 0.001 | 0.001 | 0.001 | 0.001 | 0.001 | 0.001 | 0.001 | 0.001 | 0.001 | 0.001 | 0.001 |
| P | 0.002 | 0.002 | 0.002 | 0.002 | 0.004 | 0.002 | 0.002 | 0.002 | 0.002 | 0.002 | 0.002 |
| Al | 0.021 | 0.031 | 0.027 | 0.032 | 0.036 | 0.056 | 0.047 | 0.055 | 0.045 | 0.052 | 0.04 |
| Ti | <0.01 | <0.01 | <0.01 | <0.01 | <0.01 | <0.01 | <0.01 | <0.01 | <0.01 | <0.01 | <0.01 |
| Nb | <0.01 | <0.01 | <0.01 | <0.01 | <0.01 | <0.01 | <0.01 | <0.01 | <0.01 | <0.01 | <0.01 |
| V | 0.007 | 0.007 | 0.007 | 0.008 | 0.006 | 0.011 | 0.011 | 0.017 | 0.011 | 0.009 | 0.01 |
| Mo | <0.002 | <0.002 | <0.002 | <0.002 | <0.002 | <0.002 | <0.002 | <0.002 | <0.002 | <0.002 | <0.002 |
| Cu | 0.002 | <0.002 | <0.002 | 0.003 | <0.002 | <0.002 | <0.002 | <0.002 | 0.002 | <0.002 | <0.002 |
| Y | 0.05 | 0.15 | 0.15 | 0.10 | 0.15 | 0.09 | <0.01 | <0.01 | 0.01 | <0.01 | 0.01 |
| Ti + Nb + V + Mo + Cu | <0.04 | <0.04 | <0.04 | <0.04 | <0.04 | <0.04 | <0.040 | <0.05 | <0.04 | <0.04 | <0.04 |
| Cr + 30xC | 30.00 | 30.25 | 29.15 | 29.85 | 30.25 | 28.70 | 29.25 | 30.35 | 28.45 | 28.35 | 29.07 |

What is claimed is:

1. A steel composition consisting of, in weight percent,

| | |
|---|---|
| Chromium | 20–27.5 |
| Carbon | 0.001–0.20 |
| Silicon | <0.1 |
| Manganese | 0.005–0.10 |
| Nickel | <1.0 |
| Nitrogen | <0.25 |
| Sulphur | <0.05 |
| Phosphorus | <0.08 |
| Aluminium | <0.06 |
| Additional Defined Metals | <0.25 (total amount) |
| REM | 0.005–0.50 (total amount) | with the residue iron, excluding incidental impurities, where Additional Defined Metals is any titanium, niobium, vanadium, molybdenum and copper present in the steel composition, and REM is any rare earth metal element or elements in the group of the lanthanide elements 57 to 71, scandium and yttrium, said steel having a stable, adherent and very thin layer of chromium oxide which protects the underlying metal from further oxygen induced degradation and provides a superior level of electrical conductivity for use in components of solid oxide fuel cells.

2. A steel composition according to claim 1 consisting of, in weight percent,

| | |
|---|---|
| Chromium | 20–27.5 |
| Carbon | 0.01–0.08 |
| Silicon | <0.1 |
| Manganese | 0.005–0.05 |
| Nickel | <0.1 |
| Nitrogen | <0.20 |
| Sulphur | <0.03 |
| Phosphorus | <0.04 |
| Aluminium | <0.05 |
| Additional Defined Metals | up to 0.10 |
| REM | 0.01–0.25 | with the residue iron, excluding incidental impurities.

3. A steel composition according to claim 2 consisting of, in weight percent,

| | |
|---|---|
| Chromium | 23–25 |
| Carbon | 0.03–0.06 |
| Silicon | <0.09 |
| Manganese | 0.005–0.05 |
| Nickel | <0.02 |
| Nitrogen | <0.10 |
| Sulphur | <0.01 |
| Phosphorus | <0.04 |
| Aluminium | <0.05 |
| Additional Defined Metals | <0.10 |
| REM | 0.01–0.10 | with the residue iron, excluding incidental impurities.

4. A steel composition according to claims 1, 2, or 3 wherein the total level of any Additional Defined Metals is <0.04 weight percent.

5. In a solid oxide fuel cell stack, a component adapted to be exposed to a temperature in excess of 750° C. and an oxidising atmosphere, said component being formed of a steel composition according to claims 1, 2, or 3.

6. A connector plate for collecting electrical current from a solid oxide fuel cell, said plate being formed of a steel composition according to claims 1, 2, or 3.

7. A connector plate according to claim 6 wherein at least one surface thereof is subjected to a calorising treatment.

* * * * *